(12) United States Patent
Zhong et al.

(10) Patent No.: US 12,560,840 B2
(45) Date of Patent: Feb. 24, 2026

(54) OPTICAL MODULE AND TILED DISPLAY DEVICE

(71) Applicants:Beijing BOE Display Technology Co., Ltd., Beijing (CN); BOE Technology Group Co., Ltd., Beijing (CN)

(72) Inventors: Wei Zhong, Beijing (CN); Haijun Shi, Beijing (CN); Changjia Fu, Beijing (CN); Qingshan Qu, Beijing (CN); Haiyan Wan, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/843,321

(22) PCT Filed: Mar. 3, 2023

(86) PCT No.: PCT/CN2023/079442
§ 371 (c)(1),
(2) Date: Sep. 3, 2024

(87) PCT Pub. No.: WO2023/207329
PCT Pub. Date: Nov. 2, 2023

(65) Prior Publication Data
US 2025/0199358 A1 Jun. 19, 2025

(30) Foreign Application Priority Data

Apr. 24, 2022 (CN) .......................... 202210435058.3

(51) Int. Cl.
*G02F 1/13357* (2006.01)
*G02F 1/1335* (2006.01)

(52) U.S. Cl.
CPC .. *G02F 1/133611* (2013.01); *G02F 1/133606* (2013.01); *G02F 1/133608* (2013.01); *G02F 1/133614* (2021.01); *G02F 1/133624* (2021.01)

(58) Field of Classification Search
CPC ......... G02F 1/133611; G02F 1/133606; G02F 1/133614; G02F 1/133608;
(Continued)

(56) References Cited

U.S. PATENT DOCUMENTS

2015/0378217 A1* 12/2015 Kim .................. G02F 1/133617
349/71
2020/0326595 A1* 10/2020 Yu ........................ G02B 6/0055
(Continued)

FOREIGN PATENT DOCUMENTS

CN 101451673 A 6/2009
CN 105652523 A * 6/2016 ........... G02F 1/1333
(Continued)

OTHER PUBLICATIONS

International Search Report for PCT/CN2023/079442 Mailed Apr. 7, 2023.
(Continued)

*Primary Examiner* — Erin Kryukova
(74) *Attorney, Agent, or Firm* — Ling Wu; Stephen Yang; Ling and Yang Intellectual Property

(57) ABSTRACT

An optical module and a tiled display device. The optical module comprises: a diffusion plate (10*b*); a color conversion layer (20*b*) provided on one side of the diffusion plate (10*b*); and a wavelength selective transmission layer (30) provided between the diffusion plate (10*b*) and the color conversion layer (20*b*), wherein the wavelength selective transmission layer (30) is configured to transmit light of a
(Continued)

specific color and prevent the transmission of light of colors other than the light of the specific color.

13 Claims, 3 Drawing Sheets

(58) Field of Classification Search
CPC ......... G02F 1/133624; G02F 1/133615; G02F 1/13336; G02F 1/133613; G02F 1/133317; G02F 1/133603; G02F 1/133617; G02F 1/133607
See application file for complete search history.

(56) References Cited

U.S. PATENT DOCUMENTS

| | | | | |
|---|---|---|---|---|
| 2021/0033926 A1 * | 2/2021 | Lim | .................. | G02F 1/133603 |
| 2021/0263379 A1 * | 8/2021 | Lee | .................. | G02F 1/133606 |
| 2021/0271135 A1 * | 9/2021 | Iwamoto | ............ | H01L 25/0753 |

FOREIGN PATENT DOCUMENTS

| | | | | | |
|---|---|---|---|---|---|
| CN | 107960116 A | | 4/2018 | | |
| CN | 108200247 A | * | 6/2018 | ........... | G02F 1/1336 |
| CN | 109946878 A | * | 6/2019 | .............. | G02B 5/26 |
| CN | 110456557 A | | 11/2019 | | |
| CN | 110928038 A | * | 3/2020 | ....... | G02F 1/133605 |
| CN | 210605291 U | | 5/2020 | | |
| CN | 210626832 U | | 5/2020 | | |
| CN | 111650775 A | * | 9/2020 | ....... | G02F 1/133606 |
| CN | 112859447 A | | 5/2021 | | |
| CN | 214751228 U | * | 11/2021 | | |
| CN | 214751236 U | | 11/2021 | | |
| CN | 215067622 U | | 12/2021 | | |
| CN | 109946878 B | * | 2/2022 | ....... | G02F 1/133603 |
| CN | 114019723 A | | 2/2022 | | |
| CN | 114675451 A | | 6/2022 | | |
| JP | 6092446 B1 | * | 3/2017 | ............ | C09K 11/08 |
| JP | 2017-181901 A | | 10/2017 | | |
| KR | 20210085701 A | * | 7/2021 | | |
| WO | 2021248970 A1 | | 12/2021 | | |

OTHER PUBLICATIONS

Office Action dated Nov. 15, 2022 for CN 202210435058.3 and English Translation.

* cited by examiner

OPTICAL MODULE AND TILED DISPLAY DEVICE

CROSS-REFERENCE TO RELATED APPLICATION

The present application is a U.S. National Phase Entry of International Application No. PCT/CN2023/079442 having an international filing date of Mar. 3, 2023, which claims priority to application No. 202210435058.3 filed to the CNIPA on Apr. 24, 2022. Contents of the above-identified applications are incorporated into the present application by reference.

TECHNICAL FIELD

The present disclosure relates to, but is not limited to, the field of display technologies, and particularly to an optical module and a splicing display device.

BACKGROUND

A Mini LED technology has an outstanding performance on display products. At present, a Mini LED has been widely used in display scenes, such as commercial display, high-end TV, and cinema. As a kind of commercial display, a LCD splicing screen has become a development trend by introducing a Mini LED backlight technology to iteratively upgrade product performance.

At present, a large-size splicing screen display is widely used, especially in places, such as major exhibition, supermarket, conference room, and concert. A physical seam between a display unit and a display unit for splicing is gradually shrinking. At present, the seams in the market are divided into three series according to a seam size: SNB, UNB and RNB, and corresponding seams are 3.Xmm, 1.Xmm and 0.Xmm respectively. Among them, a RNB extremely narrow seam belongs to a high-end series. From the market positioning point of view, the RNB extremely narrow seam is very suitable for using the Mini LED technology to achieve a high brightness, a high contrast and a high color gamut image quality improvement.

In addition, with a rapid development of the technology, the splicing screen display pursues higher screen brightness, more gorgeous picture effect, higher color saturation and better light uniformity in image quality. By combining a blue Mini LED with a quantum dot film, red and green quantum dots are excited by blue light, emitting a narrow half-peak wide spectrum to achieve a high color gamut. Combined with a local dimming technology, a high dynamic contrast and a high contrast in the same picture are achieved.

SUMMARY

The following is a summary of subject matter described herein in detail. This summary is not intended to limit the protection scope of the claims.

In a first aspect, an embodiment of the present disclosure provides an optical module, including: a diffusion plate; a color conversion layer stacked on a side of the diffusion plate; and a wavelength-selective transmission layer stacked between the diffusion plate and the color conversion layer. The wavelength-selective transmission layer is configured to transmit light of a specific color and prevent transmission of light of other colors except the light of the specific color.

In an exemplary implementation, the wavelength-selective transmission layer is configured to transmit blue light and block light transmission of red light and green light.

In an exemplary implementation, the wavelength-selective transmission layer is a color filter layer and the wavelength-selective transmission layer is configured to transmit light of a specific color and absorb light of other colors except the light of the specific color.

In an exemplary implementation, an adhesive layer is further included. The adhesive layer is provided between the wavelength-selective transmission layer and the color conversion layer.

In an exemplary implementation, the wavelength-selective transmission layer is a wavelength-selective reflection layer and the wavelength-selective transmission layer is configured to transmit light of a specific color and reflect light of other colors except the light of the specific color.

In an exemplary implementation, a first adhesive layer and a second adhesive layer are further included, the first adhesive layer is provided between the wavelength-selective transmission layer and the diffusion plate, and the second adhesive layer is provided between the wavelength-selective transmission layer and the color conversion layer.

In an exemplary implementation, the diffusion plate includes a transparent substrate and a diffusion layer provided on a side of the transparent substrate away from the color conversion layer.

In an exemplary implementation, the diffusion layer is made of an ink material.

In an exemplary implementation, the transparent substrate is made of a glass material.

In an exemplary implementation, the transparent substrate has a thickness of 0.7 mm to 1.1 mm.

In an exemplary implementation, the color conversion layer includes a first protective layer and a second protective layer that are oppositely provided, and a quantum dot film layer provided between the first protective layer and the second protective layer.

In an exemplary implementation, a side surface of the diffusion plate, a side surface of the wavelength-selective transmission layer, and a side surface of the color conversion layer are flush.

In an exemplary implementation, a frame sealing glue layer is further included, a portion of the frame sealing glue layer is provided on a side surface of the diffusion plate, and a portion of the frame sealing glue layer is provided on a side surface of the wavelength-selective transmission layer and a side surface of the color conversion layer.

In an exemplary implementation, the frame sealing glue layer is made of photosensitive glue.

In a second aspect, an embodiment of the present disclosure further provides a splicing display device, including multiple display units spliced to each other. The display units include a backlight module and a display panel provided opposite to each other, and the optical modules of any one of embodiments described above provided between the backlight module and the display panel.

In an exemplary implementation, the backlight module includes: a back plate; a middle bezel, wherein the middle bezel is connected with the back plate and forms a support structure together with the back plate, the support structure is provided with an optical cavity, and the optical module is provided on the support structure; and a light emitting substrate, wherein the light emitting substrate is located in the optical cavity and is provided opposite to the optical module, and the light emitting substrate includes multiple light sources and a reflection layer located on a peripheral side of the multiple light sources.

In an exemplary implementation, the middle bezel is made of a metal extrusion profile.

Other aspects may become clear after the drawings and the detailed description are read and understood.

BRIEF DESCRIPTION OF DRAWINGS

The drawings are used for providing an understanding of technical solutions of the present disclosure, and constitute a part of the specification. The drawings, together with embodiments of the present disclosure, are used for explaining the technical solutions of the present disclosure, and do not constitute limitations on the technical solutions of the present disclosure.

DETAILED DESCRIPTION

Figure 1:
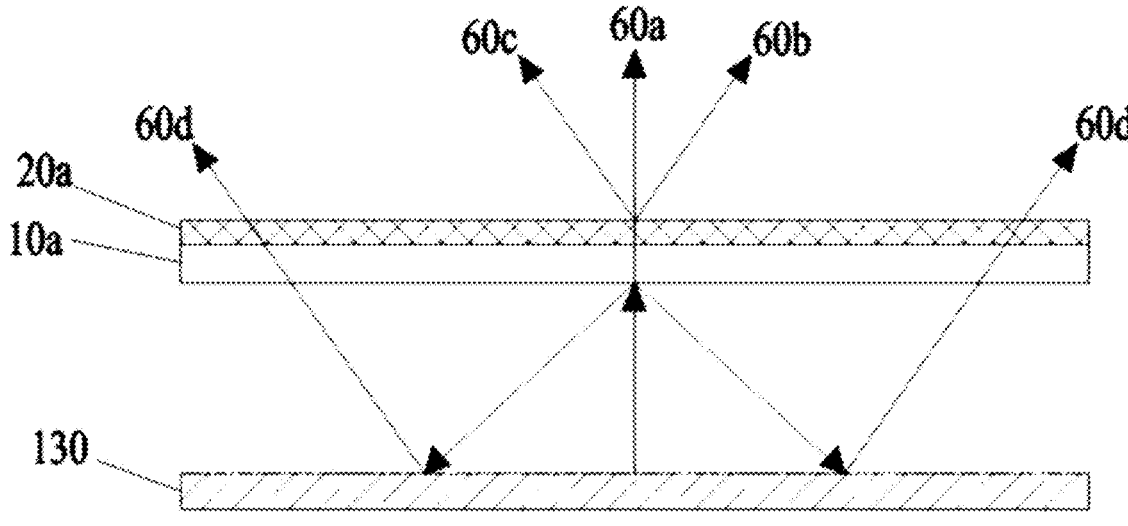
FIG. 1 is a cross-sectional view of a single area in a display device in the related art.

To make objectives, technical solutions, and advantages of the present disclosure clearer, embodiments of the present disclosure will be described in detail below with reference to the drawings. It is to be noted that implementations may be implemented in multiple different forms. Those of ordinary skills in the art can easily understand such a fact that implementations and contents may be transformed into various forms without departing from the purpose and scope of the present disclosure. Therefore, the present disclosure should not be explained as being limited to the contents recorded in the following implementations only. The embodiments and features in the embodiments of the present disclosure may be randomly combined with each other if there is no conflict.

In the drawings, a size of each composition element, a thickness of a layer, or a region may be exaggerated sometimes for clarity. Therefore, an implementation of the present disclosure is not always limited to the size, and the shape and size of each component in the drawings do not reflect an actual scale. In addition, the drawings schematically illustrate ideal examples, and an implementation of the present disclosure is not limited to shapes, numerical values, or the like shown in the drawings.

Ordinal numerals "first", "second", "third" and the like in the specification are set not to form limits in numbers but only to avoid confusion between composition elements.

In the specification, for convenience, expressions "central", "above", "below", "front", "back", "vertical", "horizontal", "top", "bottom", "inside", "outside" and the like for indicating directional or positional relationships are used to illustrate positional relationships between the composition elements with respect to the drawings, which are only for the convenience of describing the specification and simplifying the description, and do not indicate or imply that involved devices or elements are required to have specific orientations, are structured and operated in the specific orientations, and thus should not be understood as limitations on the present disclosure. The positional relationships between the composition elements may be changed as appropriate according to a direction in which each composition element is described. Therefore, appropriate replacements based on situations are allowed, and the positional relationships are not limited to the expressions described in the specification.

In the specification, unless otherwise expressly specified and defined, terms "mounting", "connection", and "join" should be understood in a broad sensing. For example, it may be a fixed connection, or a detachable connection, or an integral connection; it may be a mechanical connection or an electrical connection; it may be a direct connection, or an indirect connection through an intermediate, or an internal communication between two elements. Those of ordinary skills in the art can understand specific meanings of the above terms in the present disclosure according to specific situations.

In the specification, "parallel" refers to a state in which an angle formed by two straight lines is $-10°$ or more and $10°$ or less, and thus also includes a state in which the angle is $-5°$ or more and $5°$ or less. In addition, "perpendicular" refers to a state in which an angle formed by two straight lines is $80°$ or more and $100°$ or less, and thus also includes a state in which the angle is $85°$ or more and $95°$ or less.

In the specification, a "film" and a "layer" are interchangeable. For example, a "conductive layer" may be replaced with a "conductive film" sometimes. Similarly, an "insulation film" may be replaced with an "insulation layer" sometimes.

In the present disclosure, "about" means that a boundary is not defined so strictly and numerical values within a range of process and measurement errors are allowed.

FIG. 1 is a cross-sectional view of a single area in a display device in the related art. As shown in FIG. 1, a splicing display device in the related art includes a backlight module, a diffusion plate 10a stacked on a light emitting side of the backlight module, a color conversion layer 20a stacked on a side of the diffusion plate 10a away from the backlight module, and a display panel stacked on a side of the color conversion layer 20a away from the backlight module. The backlight module includes a light emitting substrate 130, and the light emitting substrate 130 includes a light source and a reflection layer located on a peripheral side of the light source. The light source of the light emitting substrate 130 may be a blue LED and the light source is configured to emit blue light in a direction toward the color conversion layer 20a. The color conversion layer 20a may be made of a quantum dot material, and the color conversion layer 20a is configured to receive blue light 60a emitted from the light source and be excited by the blue light 60a to generate red light 60b and green light 60c. The red light 60b and the green light 60c may be combined with unexcited blue light 60a to form white light. The display panel can be a liquid crystal display panel.

According to a research from the inventor of the present disclosure, it is found that a display device in the related art adopts Local Dimming, and when a single area is light on, yellow light diffuses outside a light spot of a single area. In this single area, a center of the light spot has high brightness and low color coordinate (color is white bluish), an edge of the light spot has a reduced brightness and an increased color coordinate (color is yellowish), and a yellow halo can be seen at the edge of the light spot.

The mechanism of yellow light diffusion outside the light spot of a single area in the display device in the related art is as follows: as shown in FIG. 1, the light source of the light emitting substrate 130 emits blue light 60a in the direction toward the color conversion layer 20a, and the color conversion layer 20a is excited by the blue light 60a to generate red light 60b and green light 60c. Since the excited red light 60b and green light 60c of the color conversion layer 20a are scattering light sources in various directions, a portion of the excited red light 60b and green light 60c of the color conversion layer 20a are emitted in a direction toward the display panel, and a portion of the excited red light 60b and green light 60c of the color conversion layer 20a are emitted in a direction toward the light emitting substrate 130. The red light 60b and the green light 60c emitted in the direction toward the light emitting substrate 130 combine into yellow light 60d in an optical cavity, are reflected at a reflection layer of the light emitting substrate 130, and are emitted in the direction toward the display panel, so that the edge of the light spot in a single area of the display device is expanded and extended, and the light spot formed is a non-uniform color light spot with a yellowish edge, and an area of the light spot is greater than a display area of the single area.

Because there is yellow light diffusion around the light spot displayed by lighting on a single area, when the display device in the related art displays a multi-line pattern or a picture with an obvious bright/dark boundary in Local Dimming mode, a yellow halo will be formed close to lines or at the boundary position of dark state pictures, which will lead to distortion of picture details and reduction of viewing effect.

Figure 2:
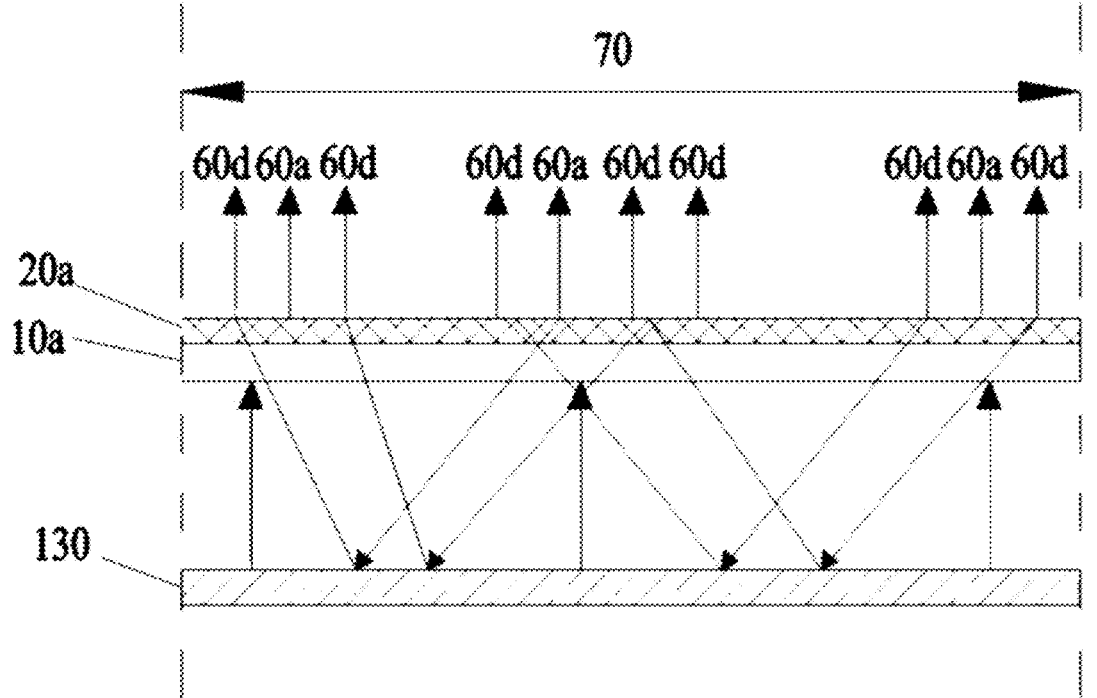
FIG. 2 is a cross-sectional view of a display region in a display device in the related art.

FIG. 2 is a cross-sectional view of a display region in a display device in the related art. According to a research from the inventor of the present disclosure, as shown in FIG. 2, it is found that when the display device in the related art displays a picture, a brightness distribution of a light exit surface of a straight down backlight source can be decomposed into a superposition of light spots of multiple single areas. Since a light spot displayed on the light exit surface corresponding to a single area is a non-uniform color light spot with a bluish center and a yellowish edge, after light spots are superimposed, the yellow light 60d reaching an edge area of the display region of the display device is less than the yellow light 60d reaching an central area, resulting in an edge of the display region 70 of the display device turning blue. For example, when the display region 70 displays a white picture, there is a blue area with an annular width of about 50 mm around the white picture.

An embodiment of the present disclosure provides an optical module, including: a diffusion plate; a color conversion layer stacked on a side of the diffusion plate; and a wavelength-selective transmission layer stacked between the diffusion plate and the color conversion layer, the wavelength-selective transmission layer being configured to transmit light of a specific color and prevent transmission of light of other colors except the light of the specific color.

In an exemplary implementation, the wavelength-selective transmission layer is configured to transmit blue light and block light transmission of red light and green light.

In an exemplary implementation, the wavelength-selective transmission layer is a color filter layer, and the wavelength-selective transmission layer is configured to transmit light of a specific color and absorb light of other colors except the light of the specific color.

In an exemplary implementation, an adhesive layer is further included, and the adhesive layer is provided between the wavelength-selective transmission layer and the color conversion layer.

In an exemplary implementation, the wavelength-selective transmission layer is a wavelength-selective reflection layer, and the wavelength-selective transmission layer is configured to transmit light of a specific color and reflect light of other colors except the light of the specific color.

In an exemplary implementation, a first adhesive layer and a second adhesive layer are further included, the first adhesive layer is provided between the wavelength-selective transmission layer and the diffusion plate, and the second adhesive layer is provided between the wavelength-selective transmission layer and the color conversion layer.

In an exemplary implementation, the diffusion plate includes a transparent substrate and a diffusion layer provided on a side of the transparent substrate away from the color conversion layer.

In an exemplary implementation, the diffusion layer is made of an ink material.

In an exemplary implementation, the transparent substrate is made of a glass material.

In an exemplary implementation, the transparent substrate has a thickness of 0.7 mm to 1.1 mm.

In an exemplary implementation, the color conversion layer includes a first protective layer and a second protective layer that are oppositely provided, and a quantum dot film layer provided between the first protective layer and the second protective layer.

In an exemplary implementation, a side surface of the diffusion plate, a side surface of the wavelength-selective transmission layer, and a side surface of the color conversion layer are flush.

In an exemplary implementation, a frame sealing glue layer is further included, a portion of the frame sealing glue layer is provided on a side surface of the diffusion plate, and a portion of the frame sealing glue layer is provided on a side surface of the wavelength-selective transmission layer and a side surface of the color conversion layer.

In an exemplary implementation, the frame sealing glue layer is made of photosensitive glue.

Figure 3:
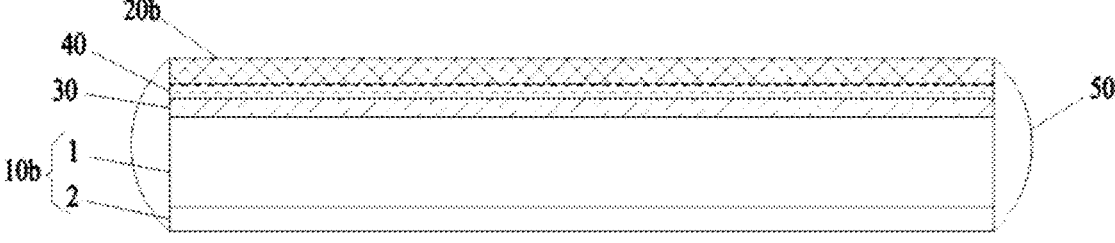
FIG. 3 is a first schematic diagram of a structure of an optical module according to an embodiment of the present disclosure.

FIG. 3 is a first schematic diagram of a structure of an optical module according to an embodiment of the present disclosure. In an exemplary implementation and as shown in FIG. 3, the optical module of an embodiment of the present disclosure includes a diffusion plate 10b, a wavelength-selective transmission layer 30 stacked on a side of the diffusion plate 10b, and a color conversion layer 20b stacked on a side of the wavelength-selective transmission layer 30 away from the diffusion plate 10b. The wavelength-selective transmission layer 30 is configured to transmit light of a specific color and prevent transmission of light of other colors except the light of the specific color. Light of the specific color transmitted by the wavelength-selective transmission layer 30 may be the same color as light emitted from the light emitting substrate. For example, the light emitted by the light emitting substrate is blue light and the wavelength-selective transmission layer 30 is configured to transmit the blue light and prevent the red light and the green light from being transmitted.

In some embodiments, the light of the specific color in an embodiment of the present disclosure may also be different from the light emitted by the light emitting substrate as long as the light of the specific color can excite the color conversion layer to generate light for displaying an image.

The display device adopts Local Dimming. When a single area is light on, the optical module of an embodiment of the present disclosure prevents the transmission of light of other colors except the light of the specific color through the wavelength-selective transmission layer 30, for example, prevents the transmission of red light and green light, so that the red light and the green light cannot pass through the wavelength-selective transmission layer 30, thereby solving a problem of yellow light diffusion outside the light spot of the single area.

When an optical module of an embodiment of the present disclosure displays a multi-line pattern or a picture with an obvious bright/dark boundary in a Local Dimming mode of the display device, it can eliminate a yellow halo close to lines or at the boundary position of a dark state picture, retain picture details, increase the contrast close to the lines or at the boundary of a bright and dark picture, and improve the viewing effect of a picture.

Figure 4:
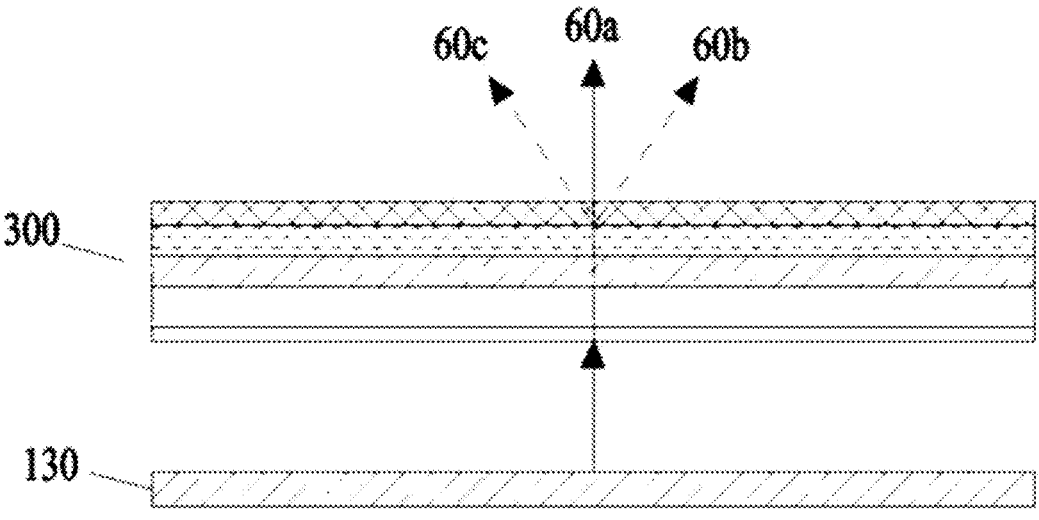
FIG. 4 is a first schematic diagram of a light path in an optical module according to an embodiment of the present disclosure.

FIG. 4 is a first schematic diagram of a light path in an optical module according to an embodiment of the present disclosure. As shown in FIGS. 3 and 4, illustration is made with an example in which the wavelength-selective transmission layer 30 is configured to transmit blue light and prevent transmission of red light and green light. When the display device lights on a single area, an optical module 300 of an embodiment of the present disclosure receives a blue light 60a emitted from the light emitting substrate 130, the wavelength-selective transmission layer 30 in the optical module 300 transmits the blue light 60a emitted from the light emitting substrate 130, the blue light 60a emitted from the light emitting substrate 130 is absorbed by the color conversion layer 20b through the wavelength-selective transmission layer 30, and the color conversion layer 20b is excited by the blue light 60a emitted from the light emitting substrate 130 to generate red light 60b and green light 60c. A portion of the red light 60b and a portion of the green light 60c are emitted in a direction away from the wavelength-selective transmission layer 30 for synthesizing white light with the remaining unexcited blue light 60a; and a portion of the red light 60b and a portion of the green light 60c are emitted in a direction close to the wavelength-selective transmission layer 30. Since the wavelength-selective transmission layer 30 can only transmit the blue light 60a, the transmission of the red light 60b and the green light 60c is prevented, and the yellow light synthesized by the red light 60b and the green light 60c is prevented from being reflected at the reflection layer of the light emitting substrate 130, thus solving a problem of a yellow halo appearing around the light spot of a single area of a display device.

Figure 5:
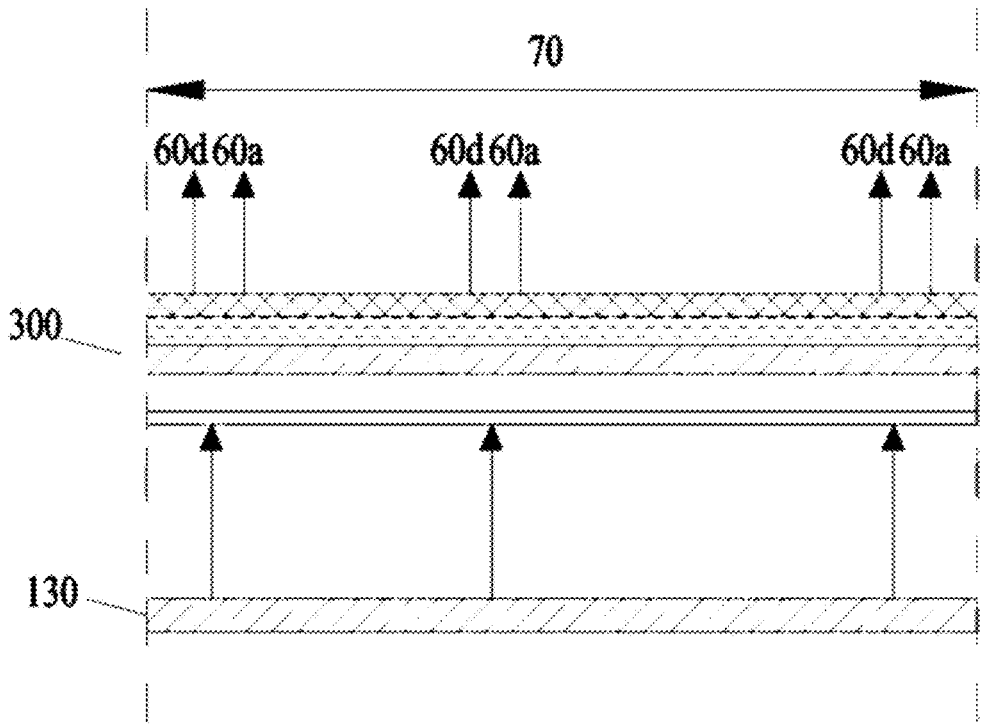
FIG. 5 is a second schematic diagram of a light path in an optical module according to an embodiment of the present disclosure.

FIG. 5 is a second schematic diagram of a light path in an optical module according to an embodiment of the present disclosure. As shown in FIG. 5, illustration is made with an example in which the wavelength-selective transmission layer 30 is configured to transmit blue light and prevent transmission of red light and green light. In the optical module of an embodiment of the present disclosure, when the display device displays a picture, the wavelength-selective transmission layer 30 prevents the red light and the green light generated by the excitation of the color conversion layer 20b from being emitted toward the reflection layer of the light emitting substrate 130, thereby preventing the diffusion of the yellow light 60d synthesized by the red light and the green light. Thus, there is no yellow halo around the light spot in a single area of the display device, and the blue light 60a and the yellow light 60d in the light spot are uniformly emitted, thus solving a problem that an edge area of the display region 70 of the display device is bluish due to a superposition of non-uniform color light spots.

In an exemplary implementation and as shown in FIG. 3, the diffusion plate 10b includes a transparent substrate 1 and a diffusion layer 2, and at least one surface of the transparent substrate 1 is stacked with the diffusion layer 2. The diffusion layer 2 is configured to scatter the light emitted by a light source in the light emitting substrate, so as to homogenize the light emitted by the light source, and further enable a point shaped light source to become a surface light source through a light divergence action of the diffusion plate 10b. The surface light source then is supplied to the display panel, so that an effect of an image displayed by the display panel is better and a good experience is brought to a user.

In an exemplary implementation, the diffusion layer 2 may be provided on one surface of the transparent substrate 1, or a quantity of the diffusion layers is two, and the two diffusion layers are stacked on two surfaces of the transparent substrate 1 respectively. For example, the diffusion layer 2 is made of an ink material and is provided on a surface of the transparent substrate 1 away from the color conversion layer 20b. The ink material may be silicon oxygen compound, and the thickness of the diffusion layer 2 may be about 10 μm to 20 μm, as shown in FIG. 3.

In an embodiment of the present disclosure, the diffusion plate 10b is formed by combining the transparent substrate 1 and the diffusion layer 2, and the diffusion of light received by the diffusion plate 10b is achieved by the diffusion layer 2 to form a uniform surface light source, which is then transmitted by the transparent substrate 1. At the same time, the transparent substrate 1 also serves as a carrier for the diffusion layer 2.

In an exemplary implementation, a specific material, i.e. chemical composition, of the transparent substrate 1 may not be limited as long as it is a transparent glass plate. For example, the transparent substrate 1 may be made of a transparent glass substrate. Specifically, the transparent substrate 1 may be made of a low-alkali glass material with durability and a small coefficient of thermal expansion. For example, the transparent substrate 1 may be made of a Corning EXG display glass.

The transparent substrate 1 in the optical module of an embodiment of the present disclosure adopts a transparent glass substrate, which has a high strength and a small thermal expansion coefficient, can be directly stuck and fixed with a support structure in the backlight module, and simultaneously supports the display panel.

In an exemplary implementation, a thickness of the transparent substrate 1 may be set according to actual use needs, for example, a thickness of a transparent glass substrate may be about 0.5 mm to 1.5 mm, for example, from 0.7 mm to 1.1 mm.

In an exemplary implementation, a length and width dimension of the transparent substrate 1 may not be specifically limited and may be specifically set according to the needs of the display panel.

In an exemplary implementation, different connection modes between the transparent substrate 1 and the diffusion layer 2 can be selected according to a material of the diffusion layer 2. For example, when the diffusion layer 2 is made of a film material, the transparent substrate 1 and the diffusion layer 2 can be connected by a full bonding process; when the diffusion layer 2 is made of an ink material, the transparent substrate 1 and the diffusion layer 2 can be stacked by coating.

In an exemplary implementation, the wavelength-selective transmission layer 30 may be a color filter layer configured to transmit light of a specific color and absorb light of other colors except the light of the specific color. A material of the wavelength-selective transmission layer 30 includes a dispersant and a pigment. For example, the wavelength-selective transmission layer 30 may be a blue color filter layer, the material of the wavelength-selective transmission layer 30 includes a dispersant and a blue pigment, and the wavelength-selective transmission layer 30 is configured to transmit blue light and absorb red light and green light. The wavelength-selective transmission layer 30 may be stacked on a surface of the transparent substrate 1 away from the diffusion layer 2 in the diffusion plate 10b by a coating and thermosetting process as shown in FIG. 3.

In an exemplary implementation, the color conversion layer 20b is configured to receive light emitted from the light emitting substrate and is excited by the light emitted from the light emitting substrate to generate scattering light sources in various directions. The color conversion layer 20b may include a first protective layer and a second protective layer that are oppositely provided, and a quantum dot film layer provided between the first protective layer and the second protective layer. Both the first protective layer and the second protective layer may be made of a polyester thin film (PET film), which is used to block water and oxygen and protect the quantum dot film.

The quantum dot film layer in an optical module of an embodiment of the present disclosure receives the blue light emitted from the light emitting substrate, and after being excited by the blue light, emits red light and green light, and synthesizes white light with the remaining unexcited blue light. Because an emission spectrum of a quantum dot is extremely narrow, a white backlight formed by conversion and a monochromatic light obtained by the display panel also have an extremely narrow spectrum, that is, the monochromatic picture has high purity, so that high color gamut display can be achieved.

In an exemplary implementation, an optical module of an exemplary embodiment of the present disclosure further includes an adhesive layer 40, the adhesive layer 40 is provided between the wavelength-selective transmission layer 30 and the color conversion layer 20b for bonding the wavelength-selective transmission layer 30 and the color conversion layer 20b. The adhesive layer 40 is a light-transmissive glue layer, for example, the adhesive layer 40 may be made of OCA glue.

In an exemplary implementation, a side surface of the diffusion plate 10b, a side surface of the wavelength-selective transmission layer 30, and a side surface of the color conversion layer 20b are flush. An orthographic projection of the diffusion plate 10b on a plane where the optical module is located, an orthographic projection of the wavelength-selective transmission layer 30 on the plane where the optical module is located, and an orthographic projection of the color conversion layer 20b on the plane where the optical module is located completely overlap.

In an exemplary implementation, the optical module of an embodiment of the present disclosure further includes a frame sealing glue layer 50. A portion of the frame sealing glue layer 50 is provided on a side surface of the diffusion plate 10b, and a portion of the frame sealing glue layer 50 extends to a side surface of the color conversion layer 20b, and is provided on a side surface of the wavelength-selective transmission layer 30, a side surface of the adhesive layer 40, and a side surface of the color conversion layer 20b.

In an exemplary implementation, the frame sealing glue layer 50 may cover a side surface of the diffusion plate 10b, a side surface of the wavelength-selective transmission layer 30, a side surface of the adhesive layer 40, and a side surface of the color conversion layer 20b by a dispensing process. The frame sealing glue layer 50 can be made of photosensitive glue (UV glue), and the photosensitive glue has a high water resistance and can prevent blue light overflow at a display edge due to an edge failure of the color conversion layer 20b.

Figure 6:
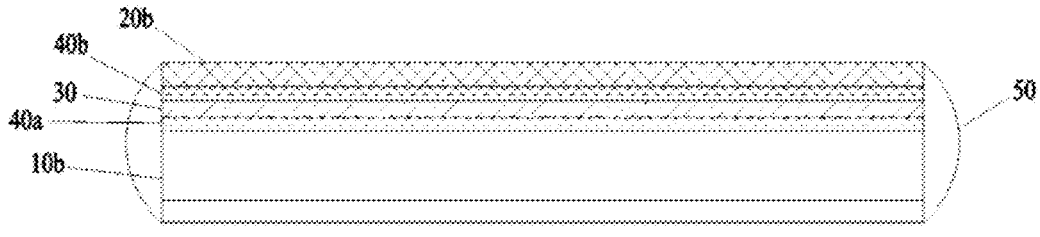
FIG. 6 is a second schematic diagram of a structure of an optical module according to an embodiment of the present disclosure.

FIG. 6 is a second schematic diagram of a structure of an optical module according to an embodiment of the present disclosure. In an exemplary implementation and as shown in FIG. 6, the optical module of an embodiment of the present disclosure includes a diffusion plate 10b, a wavelength-selective transmission layer 30 stacked on a side of the diffusion plate 10b, and a color conversion layer 20b stacked on a side of the wavelength-selective transmission layer 30 away from the diffusion plate 10b. The wavelength-selective transmission layer 30 may employ a wavelength-selective reflection layer, and the wavelength-selective transmission layer 30 is configured to transmit light of a specific color and reflect light of other colors except the light of the specific color, which prevents light of other colors except the light of the specific color from passing through the wavelength-selective transmission layer 30. For example, the wavelength-selective transmission layer 30 is configured to transmit blue light and reflect red light and green light.

In an exemplary implementation, the optical module of an embodiment of the present disclosure further includes a first adhesive layer 40a and a second adhesive layer 40b, the first adhesive layer 40a is provided between the diffusion plate 10b and the wavelength-selective transmission layer 30, and the first adhesive layer 40a bonds the diffusion plate 10b and the wavelength-selective transmission layer 30. The second adhesive layer 40b is provided between the wavelength-selective transmission layer 30 and the color conversion layer 20b and bonds the wavelength-selective transmission layer 30 and the color conversion layer 20b.

Figure 7:
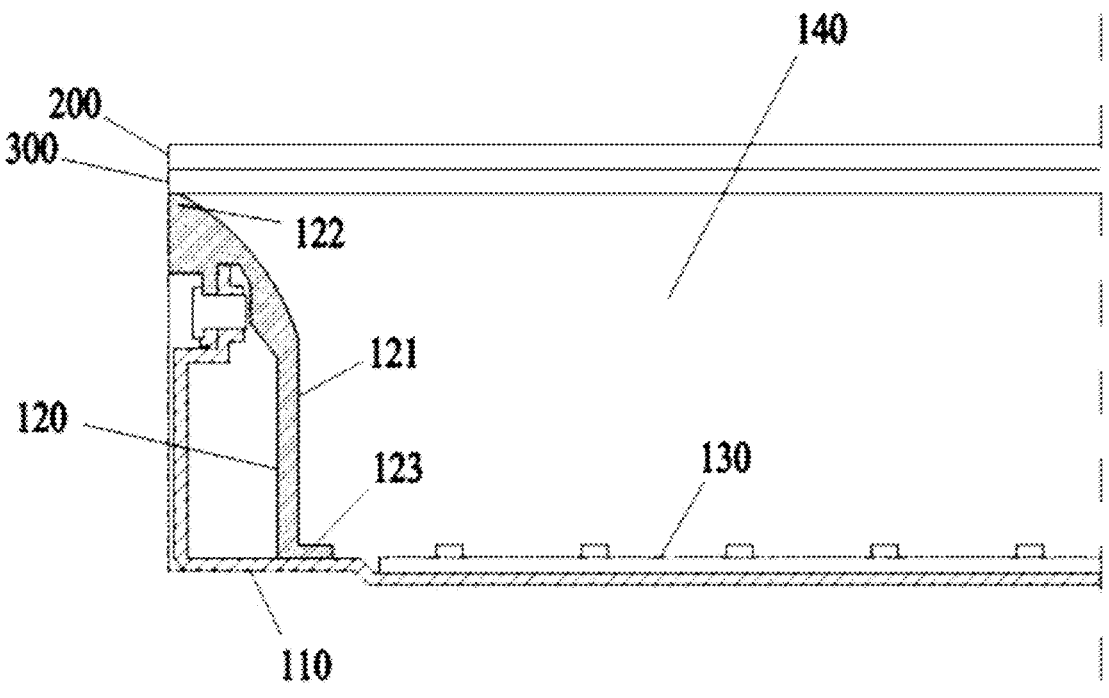
FIG. 7 is a schematic diagram of a structure of a splicing display device according to an embodiment of the present disclosure.

FIG. 7 is a schematic diagram of a structure of a splicing display device according to an embodiment of the present disclosure. In an exemplary implementation, as shown in FIG. 7, an embodiment of the present disclosure further provides a splicing display device, including multiple display units spliced with each other. The display units include a backlight module and a display panel 200 provided opposite to each other, and an optical module 300 provided between the backlight module and the display panel 200, the optical module 300 being the optical module of any one of embodiments described above. The backlight module may be a straight down backlight source. The display panel 200 may be a liquid crystal display panel.

In an exemplary implementation, the backlight module includes: a back plate 110, the back plate 110 including a bottom wall and a side wall provided on a peripheral side of the bottom wall; a middle bezel 120, the middle bezel 120 connected to the back plate 110 and together with the back plate 110 forms a support structure, the support structure having an optical cavity 140, the optical module 300 being provided on the support structure; and a light emitting substrate 130, the light emitting substrate 130 provided on the bottom wall of the back plate 110 and located in the optical cavity.

In an exemplary implementation, an orthographic projection of the optical module 300 on a plane where the splicing display device is located, an orthographic projection of the bottom wall of the back plate 110 on the plane where the splicing display device is located, and an orthographic projection of the display panel 200 on the plane where the splicing display device is located coincide.

In an exemplary implementation, the back plate 110 may be made of a metal material, whose structure is known to those skilled in the art and will not be repeated herein.

In an exemplary implementation, the middle bezel 120 includes a support main body 121 and a first support part 122 and a second support part 123 connected to two sides of the support main body 121, the first support part 122 being located on a side of the second support part 123 close to the optical module 300. The first support part 122 is an end part of the support structure close to the optical module 300. The first support part 122 has a support surface, and the support surface contacts the optical module 300 and supports the optical module 300. The second support part 123 is an end part of the support structure close to the bottom wall of the support back plate 110 and contacts with the bottom wall of the back plate 110 to support the bottom wall of the back plate 110. A side view of the support main body 121 may be a curved type structure or a straight plate type structure. It should be understood that in other exemplary embodiments there are still more configurations available for the middle bezel 120 which fall within the scope of the present disclosure.

In an exemplary implementation, the middle bezel 120 is a support device for supporting between the back plate 110 and the optical module 300, and needs to have certain strength. In order to ensure an assembly size and improve assembly accuracy, the middle bezel 120 may be made of a metal extrusion profile, and the middle bezel 120 may be fixed to the back plate by screws to ensure a dimensional accuracy, straightness and overall strength of the backlight module. For example, an aluminum alloy extrusion profile or a magnesium alloy extrusion profile may be used for the middle bezel 120, and the metal extrusion profile has a relatively flat surface, so that a support surface of the first support part 122 of the middle bezel 120 can be flattened, and flatness of the optical module 300 after installation can be ensured. In other exemplary embodiments, the middle bezel 120 may also be a rubber frame.

In an exemplary implementation, the light emitting substrate 130 includes multiple light sources and a reflection layer located on the peripheral side of the multiple light sources. That is, an orthographic projection of the reflection layer on a plane where the splicing display device is located does not overlap with an orthographic projection of the multiple light sources on the plane where the splicing display device is located, so that the multiple light sources being shielded by the reflection layer is avoided.

In an exemplary implementation, a structure of the light sources in the light emitting substrate 130 may not be limited as long as light can be emitted. For example, a light source in the light emitting substrate 130 may be a blue Mini LED or a blue Micro LED. A typical size (e.g., length) of a Micro-LED may be less than 50 μm, e.g., from 10 μm to 50 μm. A typical size (e.g., length) of a Mini LED may be about 50 μm to 150 μm, e.g., 80 μm to 120 μm. Mini LEDs or Micro LEDs can be transferred to the light emitting substrate 130 in batches, and by cooperation with the driving design, light emitting of the light emitting substrate 130 can be achieve.

In an exemplary implementation, the reflection layer in the light emitting substrate 130 is configured to reflect incident light toward the optical module 300 to improve a backlight brightness provided by the backlight module 100. The reflection layer may be implemented in a variety of ways. For example, the reflection layer is a white paint, coated on a surface of the light emitting substrate 130 close to the optical module 300; or the reflection layer is a reflective metal layer and is evaporated on a surface of the light emitting substrate 130 close to the optical module 300.

The assembly of the splicing display device according to an embodiment of the present disclosure can adopt a two-time bonding mode. First, a surface of the optical module 300 close to the middle bezel 120 is bonded to the first support part 122 of the middle bezel 120, and then the display panel 200 is bonded to a surface of the optical module 300 away from the middle bezel 120. OCA glue can be used for both times of bonding.

Although the implementations of the present disclosure are disclosed above, the contents are only implementations used for ease of understanding of the present disclosure, but not intended to limit the present disclosure. Those skilled in the art may make any modification and change in the forms and details of the implementations without departing from the essence and scope of the present disclosure. However, the scope of protection of the present disclosure should still be subject to the scope defined by the attached claims.

The invention claimed is:

1. An optical module, comprising:
a diffusion plate;
a color conversion layer stacked on a side of the diffusion plate;
a wavelength-selective transmission layer stacked between the diffusion plate and the color conversion layer, wherein the wavelength-selective transmission layer is configured to transmit light of a specific color and prevent transmission of light of other colors except the light of the specific color; wherein a side surface of the diffusion plate, a side surface of the wavelength-selective transmission layer, and a side surface of the color conversion layer are flush; and
a frame sealing glue layer, wherein the frame sealing glue layer covers the side surface of the diffusion plate, the side surface of the wavelength-selective transmission layer, and the side surface of the color conversion layer; the frame sealing glue layer is configured to prevent blue light overflow at a display edge due to an edge failure of the color conversion layer; a cross-sectional shape of the frame sealing glue layer is arc-shaped, a maximum thickness of the frame sealing glue layer covering the color conversion layer is less than a maximum thickness of the frame sealing glue layer covering the wavelength-selective transmission layer, and the maximum thickness of the frame sealing glue layer covering the wavelength-selective transmission layer is less than a maximum thickness of the frame sealing glue layer covering the diffusion plate;
wherein the wavelength-selective transmission layer is a color filter layer, and a material of the wavelength-selective transmission layer comprises a dispersant and a blue pigment.

2. The optical module according to claim 1, wherein the wavelength-selective transmission layer is configured to transmit blue light and block transmission of red light and green light.

3. The optical module according to claim 2, wherein the wavelength-selective transmission layer is configured to transmit the blue light and absorb the red light and the green light.

4. The optical module according to claim 1, wherein the wavelength-selective transmission layer is configured to transmit light of a specific color and absorb light of other colors except the light of the specific color.

5. The optical module according to claim 4, further comprising an adhesive layer, wherein the adhesive layer is provided between the wavelength-selective transmission layer and the color conversion layer.

6. The optical module according to claim 1, further comprising a first adhesive layer and a second adhesive layer, wherein the first adhesive layer is provided between the wavelength-selective transmission layer and the diffusion plate, and the second adhesive layer is provided between the wavelength-selective transmission layer and the color conversion layer.

7. The optical module according to claim 1, wherein the diffusion plate comprises a transparent substrate and a diffusion layer provided on a side of the transparent substrate away from the color conversion layer, and the diffusion layer is made of an ink material.

8. The optical module according to claim 7, wherein the transparent substrate is made of a glass material.

9. The optical module according to claim 7, wherein the transparent substrate has a thickness of 0.7 mm to 1.1 mm.

10. The optical module according to claim 1, wherein the frame sealing glue layer is made of photosensitive glue.

11. A display device, comprising a display unit, wherein the display unit comprises a backlight module and a display panel provided opposite to each other, and the optical module according to claim 1 provided between the backlight module and the display panel.

12. The display device according to claim 11, wherein the backlight module comprises:

a back plate;

a middle bezel, wherein the middle bezel is connected with the back plate and forms a support structure together with the back plate, the support structure is provided with an optical cavity, and the optical module is provided on the support structure; and a light emitting substrate, wherein the light emitting substrate is located in the optical cavity and is provided opposite to the optical module.

13. The display device according to claim 12, wherein the middle bezel is made of a metal extrusion profile.

\* \* \* \* \*